United States Patent

Viswanadham et al.

[11] Patent Number: 6,000,312
[45] Date of Patent: Dec. 14, 1999

[54] CARBIDE CUTTING INSERT

[75] Inventors: R. K. Viswanadham, Prospect; Carl Shumaker, Louisville, both of Ky.

[73] Assignee: Credo Tool Company, Woodburn, Oreg.

[21] Appl. No.: 09/044,815

[22] Filed: Mar. 20, 1998

Related U.S. Application Data

[62] Division of application No. 08/600,350, Feb. 12, 1996, Pat. No. 5,809,848.

[51] Int. Cl.$^6$ .................................................. B23D 61/04
[52] U.S. Cl. .................................................. 83/840; 83/835
[58] Field of Search ............................ 83/835, 845, 854, 83/855, 840, 651, 658, 171, 843; 76/104.1, 112, 115; 75/200; 164/97; 82/1.11

[56] References Cited

U.S. PATENT DOCUMENTS

| | | | |
|---|---|---|---|
| 14,172 | 1/1856 | Tyler | 83/840 |
| 303,997 | 8/1884 | Gerlach et al. | 83/840 |
| 324,945 | 8/1885 | Lucas . | |
| 336,568 | 2/1886 | Jackson . | |
| 383,103 | 5/1888 | Cook | 83/840 |
| 2,073,678 | 3/1937 | Broughton . | |
| 2,361,492 | 10/1944 | Pare . | |
| 2,712,488 | 11/1955 | Eaton . | |
| 2,736,312 | 2/1956 | Goldman . | |
| 3,110,579 | 11/1963 | Benson et al. . | |
| 3,122,030 | 2/1964 | Metzger . | |
| 3,133,533 | 5/1964 | Sprague . | |
| 3,162,187 | 12/1964 | Christensen . | |
| 3,788,182 | 1/1974 | Tyler . | |
| 4,084,942 | 4/1978 | Villalobos | 51/307 |
| 4,690,074 | 9/1987 | Chaconas . | |
| 4,727,778 | 3/1988 | Omi . | |
| 4,784,033 | 11/1988 | Hayden et al. . | |
| 4,889,025 | 12/1989 | Collett | 83/835 |
| 5,040,436 | 8/1991 | Pfaltzgraff . | |

*Primary Examiner*—Kenneth E. Peterson
*Assistant Examiner*—Gyounghyun Bae
*Attorney, Agent, or Firm*—Middleton & Reutlinger; Charles G. Lamb

[57] ABSTRACT

A cutting tool insert includes a cutting tip mounted into a first recess of a molded hard refractory compound insert having a second recess of preselected size and shape for locating the insert to a cutting tool. A preferred cutting tip is a diamond and a preferred hard refractory compound is a tungsten carbide with a cobalt binder.

5 Claims, 2 Drawing Sheets

CARBIDE CUTTING INSERT

CROSS REFERENCE TO RELATED APPLICATIONS

This application is a divisional application of Ser. No. 08/600,350 filed on Feb. 12, 1996, now U.S. Pat. No. 5,809,848.

BACKGROUND OF THE INVENTION

The present invention relates to cutting devices and more particularly to a method of making an injection molded carbide insert.

Cutting tools using carbide cutting tips or carbide inserts with diamond cutting tips have been known for many years. However, in the manufacturing of cutting tools with diamond cutting tips, the attachment of diamonds to inserts or attachment to the tips of the cutting tools, particularly saw blades and the like, have presented many difficulties. Specifically, diamonds have presented difficulties in maintaining their bonds to the cutting tips for prolonged use.

Many different methods have been tried to bond diamonds onto cutting tools, such as saw blades. For example, U.S. Pat. No. 3,162,187 teaches the use of a tungsten or tungsten carbide of a suitable mesh which is impregnated with diamonds into the mesh. The diamond impregnated matrix is positioned on opposite sides of a steel reinforcing member and the steel reinforcing member is placed into a furnace at a preselected temperature for bonding the diamond impregnated matrix to the steel insert. The finished insert is then inserted into an appropriate groove in a cutting tool wherein the steel-tungsten-diamond insert is brazed in place.

U.S. Pat. No. 3,122,030 teaches a method of assembling a rotary saw blade with peripheral diamond teeth wherein the cutting part consists of a metallic matrix with crushed or fragmented diamonds distributed substantially uniformly through the matrix. The matrix is sandwiched between two steel lugs which are bonded to a tooth of a saw blade.

U.S. Pat. No. 3,110,579 also teaches a diamond tipped saw blade wherein the cutting elements of the saw blade are composed of a diamond grit embedded and dispersed in a matrix material, such as a mixture of bronze and iron. The cutting element is inserted into a groove in the blade with the diamond cutting element being bonded into the grooves.

SUMMARY OF THE INVENTION

It is an object of the present invention to provide an improved cutting tip for cutting tools.

It is another object of the present invention to provide an improved diamond cutting tip for cutting tools.

It is even another object of the present invention to provide an injection molded carbide insert for a cutting tool.

It is a further object of the present invention to provide an injection molded carbide insert for a cutting tool having two recesses of preselected size on opposite sides of the insert, one receiving an edge of a cutting blade of a cutting tool and the other recess receiving a diamond cutting tip.

More particularly, the present invention provides a method of making a cutting blade insert for a cutting tool comprising the steps of:

preparing a mixture including a spray-dried hard refractory compound;

transferring said mixture to a molder;

molding said mixture to a preselected cutting blade insert shape including a first recess for a cutting tip and a second recess for attaching to a cutting tool;

sintering said cutting blade insert;

placing a cutting tip in said first recess; and, brazing said cutting tip in said first recess.

Preferably, the cutting tip is a diamond cutting tip and the mixture for the molder contains tungsten carbide with a cobalt binder.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWINGS

A better understanding of the present invention will be had upon reference to the following description in conjunction with the accompanying drawings wherein.

DETAILED DESCRIPTION OF THE PREFERRED EMBODIMENT

Figure 1:
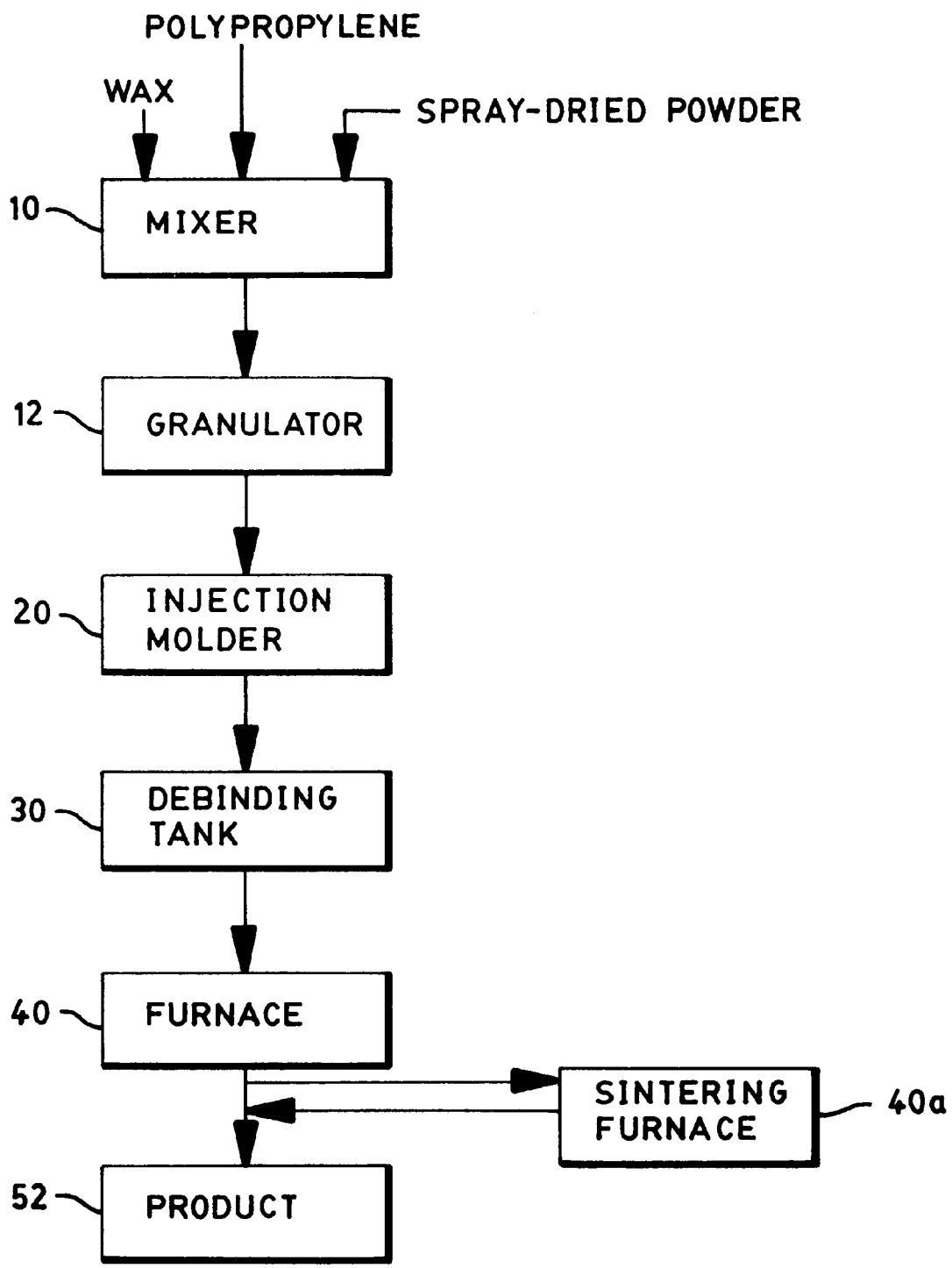
FIG. 1 is a block flow diagram showing the steps of making a carbide insert of the present invention.
Figure 2:
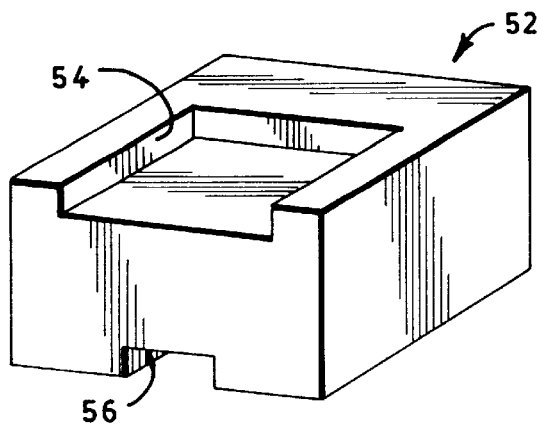
FIG. 2 is a perspective view of one preferred embodiment of the present invention showing the recess for receiving a cutting tip on the top side of the injection molded insert.
Figure 3:
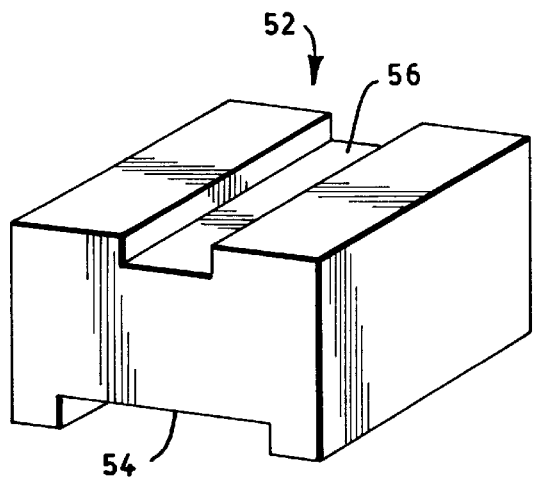
FIG. 3 is a perspective view of the injection molded insert of FIG. 2 turned 180° showing the recess for receipt of a cutting tool on the top side of the insert; and, FIG. 4 is a perspective view of the insert of FIGS. 2 and 3 with a cutting tip received within the cutting tip recess of the insert.
Figure 4:
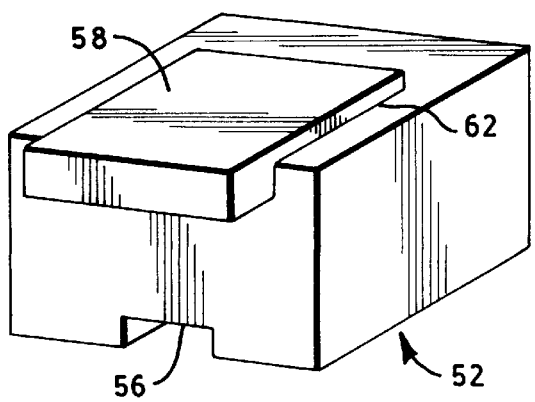

Referring to FIG. 1, from about 4 to 6 parts by weight of wax, which is generally paraffin, from about 2 to 4 parts by weight of polypropylene, and from about 90 to 94 parts by weight of a spray dried powder is added to a mixer, such as a sigma-type mixer as identified by numeral 10. The spray dried powder, which is typically a mix of a hard refractory compound, such as tungsten carbide, and a metallic binder, such as cobalt and a wax, the cobalt being from 3 to 25% by weight of the powder. These ingredients are thoroughly mixed at a temperature of from about 150 to 200° C. for generally from 1 to 3 hours. The mixture is allowed to cool to ambient and then granulated in any well-known granulator 12 to a size of usually less than ⅛" in diameter. This mixture is fed into an injection molder 20. The injection molder 20 is provided with a die of preselected size and shape so that the resulting molded product 52 is as shown in FIGS. 2, 3 and 4. The molding step is carried out at from about 150 to 200° C., generally about 170° C., at a pressure of from about 12,000 to 15,000 psi. The resulting molded product in a "green" condition is then submitted to a de-binding tank 30 which is maintained at 40 to 60° C. wherein the wax is removed by the recirculation of a solvent, generally naphtha. The resulting wax free product is then transferred to a thermal debinding operation which is carried out in a furnace identified by numeral 40 at from about 150° C. to about 500° C. for a period of about 6 to 12 hours. The resulting thermal debound product may either be transferred to a separate sintering furnace 40a or left in the furnace 40 and taken up to sintering temperatures. The sintering of the debound product generally occurs at about 1400° C. with a step-wise increase in the temperature from the thermal debinding temperature up to about 1400° C. at a rate of about 1 to 10° C. per minute. The sintered product 52 is then cooled in the furnace to ambient, then removed and cleaned, usually by "grit" blasting. The sintered product 52 is then ready for receiving a cutting tip in a first recess identified by numeral 54 in FIG. 2.

The resulting sintered injection molded product 52 is generally of rectangular configuration and, as best shown in FIGS. 2 and 3, includes the recess 54 having two opposed sidewalls, a bottom wall, and an open end of preselected size and shape to receive a cutting tip therein and a second recess 56, which is on a side opposite the recess 54. Second recess 56 is of a shape and size to receive the outer peripheral edge of a cutting tool (not shown).

As shown in FIG. 4, a cutting tip 58, generally diamond, such as a polycrystalline diamond (PCD) or diamond made by chemical vapor deposition (CVD), which is well known in the art, is received within the recess 54. It is also realized that the cutting tip 58 may be, for example, a polycrystalline boron nitride or the like. The cutting tip 58 is then cut into a preselected size and received within first recess 54 of the insert 52. Tip 58 is bonded as denoted by the numeral 62 into the recess 54 by any well known means, particularly brazing, using a silver-base alloy brazing material or an equivalent.

It will be realized that various changes can be made to the specific embodiment shown and described without departing from the principles and spirit of the present invention.

What is claimed is:

1. A cutting blade insert for a saw blade comprising:

an injection molded carbide insert of generally rectangular configuration with two opposed sidewalls, a bottom wall and an open end having a first recess for receiving a cutting tip, and a second recess of preselected size and shape for locating said insert to a saw blade; and, a cutting tip fitting within and brazed into said first recess.

2. The insert of claim 1, said cutting tip being a diamond cutting tip.

3. The insert of claim 1, said injection-molded carbide being a tungsten carbide.

4. The insert of claim 3, said injection molded carbide including cobalt.

5. The insert of claim 1, said first recess being on one side of said insert and said second recess being on an opposite side of said first recess.

* * * * *